United States Patent [19]
Choi

[11] Patent Number: 5,164,979
[45] Date of Patent: Nov. 17, 1992

[54] SECURITY SYSTEM USING TELEPHONE LINES TO TRANSMIT VIDEO IMAGES TO REMOTE SUPERVISORY LOCATION

[75] Inventor: Hyun J. Choi, Kyungsangbuk, Rep. of Korea

[73] Assignee: Goldstar Co., Ltd., Seoul, Rep. of Korea

[21] Appl. No.: 616,800

[22] Filed: Nov. 21, 1990

[30] Foreign Application Priority Data

Nov. 21, 1989 [KR] Rep. of Korea ............... 16889/1989

[51] Int. Cl.[5] ............................................. H04M 11/04
[52] U.S. Cl. ........................................ 379/40; 379/44; 379/49; 379/53; 340/533
[58] Field of Search ............... 340/691, 533, 539; 379/37, 39–40, 42–45, 47–50, 53, 54

[56] References Cited

U.S. PATENT DOCUMENTS

| | | | |
|---|---|---|---|
| 4,086,434 | 4/1978 | Bocchi . | |
| 4,688,244 | 8/1987 | Hannon et al. | 379/44 |
| 4,703,348 | 10/1987 | Yuasa et al. | 379/53 |
| 4,825,457 | 4/1989 | Lebowitz | 379/40 |
| 4,878,242 | 10/1989 | Springer et al. | 379/54 |
| 4,932,047 | 6/1990 | Emmons et al. | 379/53 |
| 4,953,196 | 8/1990 | Ishikawa et al. | 379/53 |

FOREIGN PATENT DOCUMENTS

| | | | |
|---|---|---|---|
| 1045732 | 1/1979 | Canada | 379/44 |
| 2243185 | 3/1974 | Fed. Rep. of Germany | 340/533 |
| 2841328 | 4/1980 | Fed. Rep. of Germany | 379/53 |
| 2593309 | 7/1987 | France . | |
| 63-138855 | 6/1988 | Japan | 379/44 |

OTHER PUBLICATIONS

Computer Systems; vol. 6, No. 1, Jan. 1986, Bromley G. B.; P. Wright; "Vision by Telephone" pp. 55–56.
"High Speed Freeze Frame Video Telephone", *Teleconference*, vol. 6, No. 6.

*Primary Examiner*—James L. Dwyer
*Assistant Examiner*—Wing F. Chan
*Attorney, Agent, or Firm*—Ostrolenk, Faber, Gerb & Soffen

[57] ABSTRACT

Supervisory alarm transmission and remote alarm receipt devices which, when an emergency event such as a burglar, a fire or the like that is being monitored by a supervisory alarm device takes place, the emergency event is transmitted through telephone lines in order for a remote supervisor to be able to directly watch a spot situation through a monitor, consisting of a supervisory alarm transmission device which comprises an alarm processing control section, a video data processing section and a data transmitting section, and a remote alarm receipt device which comprises a data receipt section, a receipt processing control section and a data processing section. By these arrangements, a user can take an instant countermeasure and the power consumption is minimized in a stand-by state because only the stand-by electric power is supplied to the supervisory alarm transmission device and the remote alarm receipt device until data is received according to event occurrence sensing by each sensing section and to a data transmission indication signal.

8 Claims, 5 Drawing Sheets

SECURITY SYSTEM USING TELEPHONE LINES TO TRANSMIT VIDEO IMAGES TO REMOTE SUPERVISORY LOCATION

BACKGROUND OF THE INVENTION

The present invention relates to a supervisory alarm device for monitoring to detect if there is a burglary or a fire and issuing an alarm in the event of a burglary, a fire or the like. More particularly the invention relates to supervisory alarm transmission and remote alarm receipt devices which, when an emergency event such as a burglary, a fire or the like that is being monitored by a supervisory alarm device takes place, a report of the emergency event is transmitted through telephone lines in order for a remote supervisor to be able to directly watch the spot situation at a certain time interval through a monitor.

In general, a supervisory alarm device issuing a burglar alarm, a fire alarm and the like performs its monitoring by TV cameras and sensors mounted at monitoring positions where monitoring is required both in and out of a building.

FIG. 1 is a block diagram for a simple embodiment of a conventional supervisory alarm device having a configuration that utilizes the output of a TV camera 1 for photographing on-the-spot and the output of a sensor 2 which is a voice or an alarm sensor or the like for sensing various conditions. Outputs of camera 1 and sensors 2 are applied to a screen partition unit 3 and the output of the screen partition unit 3 are applied to a monitor 5 and to a VCR (video cassette type recorder) 4.

In such a supervisory alarm device, when a control signal generated from various sensors 2 mounted at desired locations and a video signal from the camera 1 are processed by the screen partition unit 3 to perform an alarm control and are outputted to the monitor 5 and the VCR 4, a supervisor can watch the spot situations through the monitor 5 or if there is no supervisor to view monitor 5, recording is performed by the VCR 4 so that the situations of an event occurrence can be seen when a supervisor plays the recording back.

However, the above-mentioned supervisory alarm device has a problem in that an emergency situation occurrence can not be effectively prevented because an instant countermeasure cannot be taken with no instant monitoring when a supervisor is absent in case that there is no synthetic supervisory system and residing supervisor when the emergency situation, such as a burglary, a fire, or the like occurs, although an instant countermeasure can be taken with an instant monitoring of the emergency situation occurrence such as a burglary, a fire, or the like by a supervisor in case that there is a synthetic system and a residing supervisor.

SUMMARY OF THE INVENTION

Accordingly, it is an object of the present invention to provide supervisory alarm transmission and remote alarm receipt devices which enable an instant countermeasure to be taken against a burglar, a fire, or the like by allowing a remote shop owner to catch the spot situation through video at a real time at the moment that the emergency situation occurs at the supervisory alarm device-mounted places when a supervisor is absent but a supervisory alarm device is mounted at a shop that has a difficulty with or does not have a residing supervisor.

The object of the present invention is attained by allowing a remote supervisor to catch a spot situation while such event is occuring. Apparatus for accomplishing this is equipped with a supervisory alarm transmission device for transmitting to the remote supervisor certain video data obtained from a video signal generated by a TV camera mounted on the spot. The TV camera operates when a microcomputer senses the occurrence of an emergency situation through various sensors and a remote alarm receipt device for storing in memory in a supervisor's absence or displaying on a monitor in pictures the receipt of the certain video data transmitted from the supervisory alarm transmission device in response to a telephone call of the supervisory alarm transmission device.

DETAILED DESCRIPTION OF THE INVENTION

A detailed description of the present invention will is given below with reference to the accompanying drawings.

Figure 2:
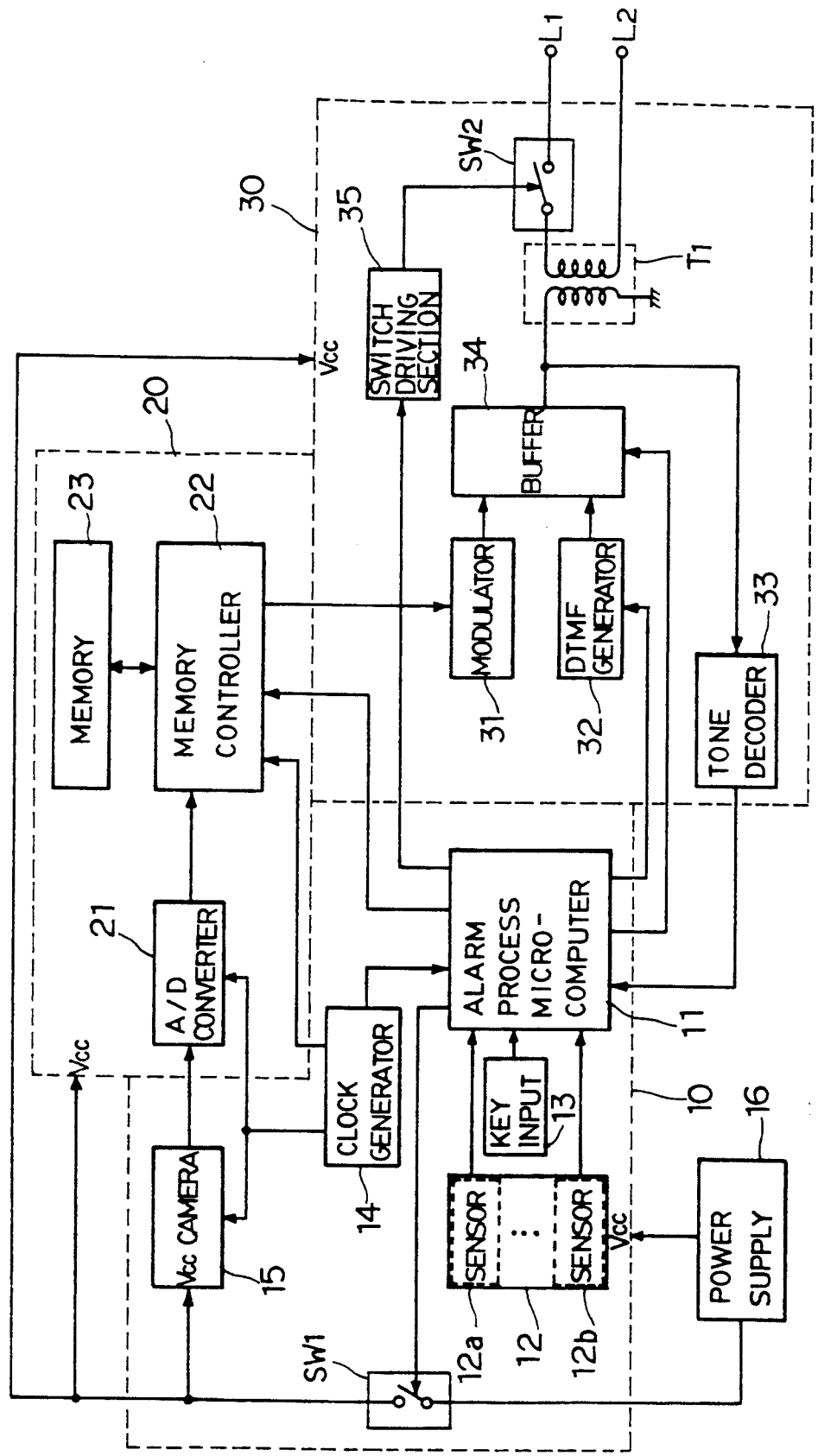
FIG. 2 is a block diagram showing the configuration of a supervisory alarm transmission device according to the present invention.

As shown in FIG. 2, the supervisory alarm transmission device 10 is constructed by, a sensing section 12 comprising sensors 12a, 12b, . . . mounted at monitoring position for obtaining outputs according to various sensing, such as a burglar, a fire or the like, an alarm processing microcomputer 11 for controlling video data processing and transmission, and controlling the operating electric power of each section by controlling a power control switch SW1 which intermits the output of the power supply 16 according to an output of the sensing section 12, a key input section 13 for inputting key data to the alarm processing microcomputer 11, a clock generator 14 for generating an operating timing clock for each section, an alarm processing control section 10 consisting of a spot TV camera 15 for photographing the spot with an operating electric power supplied through said power control switch SW1, an analog/digital converter 21 for digitizing the video signal from said spot TV camera 15, a memory 23 for storing video data, a video data processing section 20 consisting of a memory controller 22 for controlling the data storage to said memory 23 and controlling the data output from said memory 23, a modulator 31 for modulating and transmitting through telephone lines L1, L2 the video data provided by said video data processing section 20, a DTMF generator 32 for generating a dual tone multifrequency signals responsive to an output control signal of said alarm processing microcomputer 11, a buffer 34 for buffering and sending out the outputs of said modulator 31 and DTMF generator 32 responsive to an output control signal of said alarm processing microcomputer 11, a matching transformer T1 for matching to telephone lines L1, L2 and transmitting the output of said buffer 34, a tone decoder 33 for decoding and inputting to said alarm processing microcomputer 11 the tone signal received through said matching transformer T1, a transmission control switch SW2 for intermitting said telephone line L1 connected to said matching transformer T1, and a data transmitting section 30 consisting of a transmission switch driving section 35 for driving said transmission control switch SW2 responsive to an output control signal of said alarm processing microcomputer 11.

Figure 3:
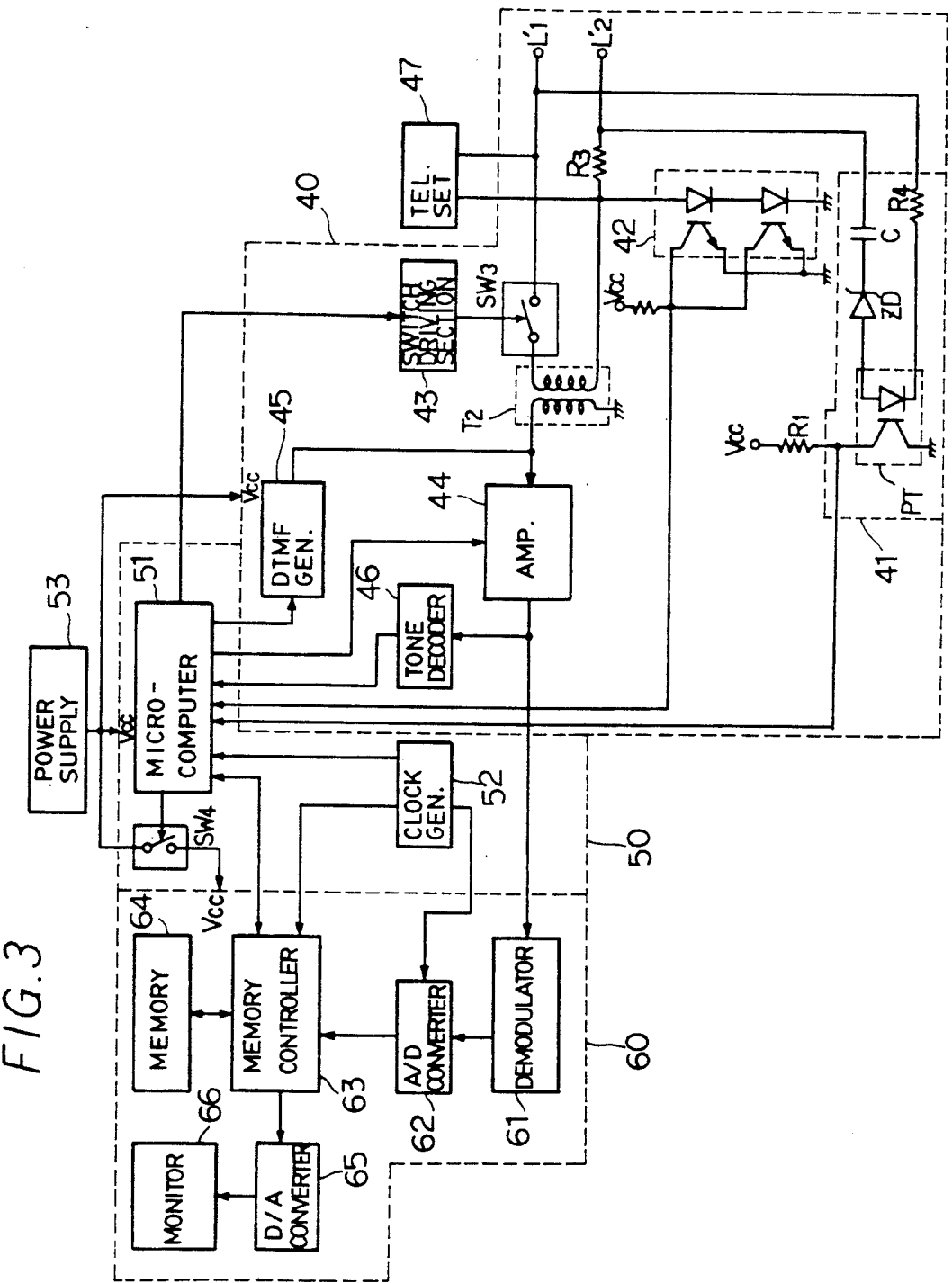
FIG. 3 is a block diagram showing the configuration of a remote alarm receipt device according to the present invention.

As shown in FIG. 3, remote alarm receipt device 200 is constituted by, a receipt control microcomputer 51 for performing a control in order to receive and transact the data transmitted in response to a call from said supervisory alarm transmission device 100, a power control switch SW4 for controlling the operating electric power for each section responsive to the control of signals from receipt control microcomputer 51, a receipt processing control section 50 consisting of a clock generator 52 producing an operating timing clock, a ring signal detector 41 for detecting and inputting to said receipt control microcomputer 51 the ring signal transmitted through telephone lines L'1, L'2, a hook detector 42 for detecting and inputting to said receipt control microcomputer 51 the on/off state of the hook switch of the telephone set 47 connected to said telephone lines L'1, L'2, a matching transformer T2 for matching with and receiving the signal transmitted through said telephone lines L'1, L'2, a receipt control switch SW3 for performing a receipt control by intermitting said telephone line L'1 connected to the matching transformer T2, a receipt switch driving section 43 for driving said receipt control switch SW3 responsive to signals from said receipt control microcomputer 51, an amplifier 44 for amplifying the signal received through said matching transformer T2 responsive to control signals from receipt control microcomputer 51, a tone decoder 46 for detecting and inputting to said receipt control microcomputer 51 the tone signal from the output signal of the amplifier 44, a data receipt section 40 consisting of a DTMF generator 45 for generating, and outputting to said matching transformer T2 a DTMF generated responsive to control of said receipt control microcomputer 51, a demodulator 61 for demodulating the signal generated from the amplifier 44 in the data receipt section 40 to a video signal, an analog/digital (A/D) converter 62 for digitizing the signal generated from the demodulator 61, a memory 64 for storing the digitized video data, a memory controller 63 for controlling said memory 64 and outputting data generated from said analog/digital converter 62 according to control signals from said receipt control microcomputer 51, a digital/analog (D/A) converter 65 for converting to an analog signal the video data generated from the memory controller 63, and a receipt data processing section 60 consisting of a monitor 66 for displaying as pictures the signals generated by and received from the digital/analog converter 65.

Figure 1:
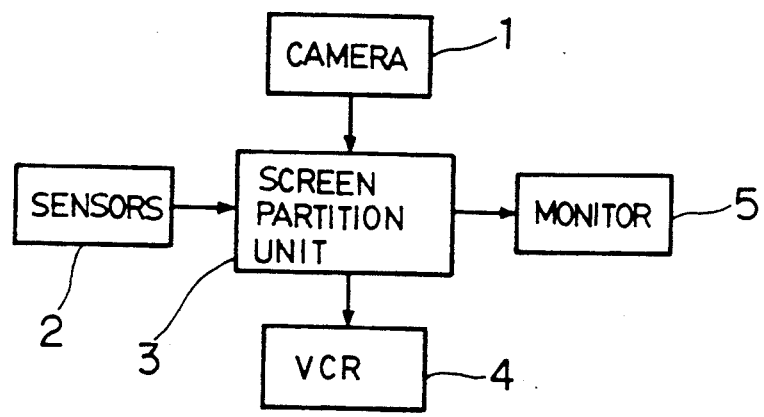
FIG. 1 is a block diagram showing the configuration of an embodiment of a conventional supervisory alarm device.

The operations and effects of the present invention having the configuration illustrated in FIGS. 1 and will be described in detail as follows with reference to the accompanying drawing FIGS. 4, 5 and 6.

Figure 4:
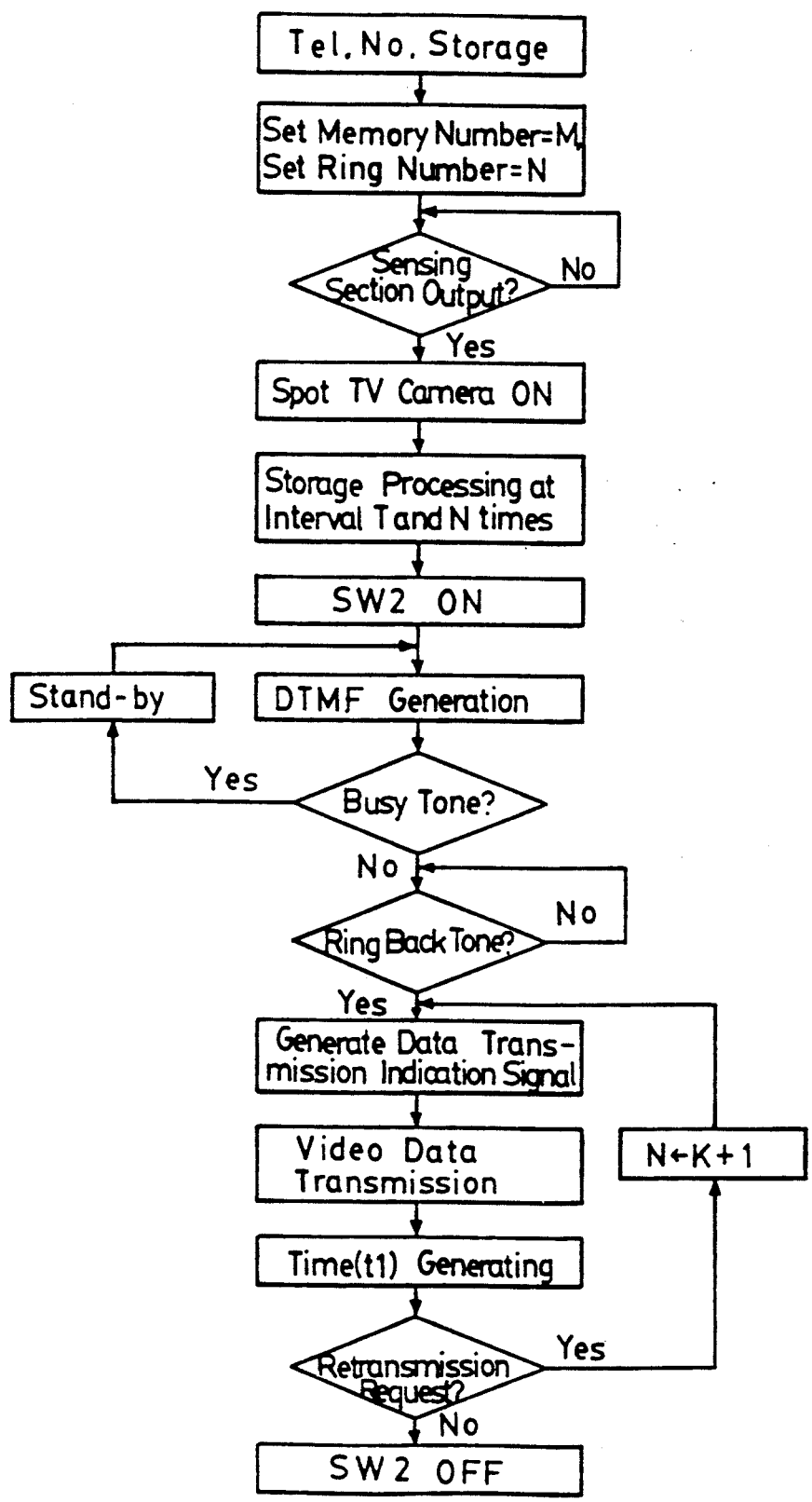
FIG. 4 is a control flow chart according to FIG. 2.

FIG. 4 is a control flow chart of a supervisory alarm transmission device 100 (FIG. 2) that is constructed according to the present invention with alarm processing microcomputer 11 controlling supervisory alarm transmission device 100.

A user inputs a telephone number with which a remote alarm receipt device 200 (FIG. 3) is equipped to the alarm processing microcomputer 11 through a key input section 13, sets the number of times of video data storage N and a time interval T to store the video data as many random number of times as desired at a random time interval so that changes in the spot situation can be caught and sets a setup time t1 for checking a retransmission request.

Thereafter, the output of the sensing section 12 which consists of sensors 12a, 12b mounted at each of monitoring positions are verified.

If the sensors 12a, 12b of the sensing section 12 detect an invader, a fire or the like and then send out a sensing output, the alarm processing microcomputer 11 turns the power control switch SW1 on to drive the spot TV camera 15 and drives the video data processing section 20 and data transmission section 30 by supplying operating electric power from the power source 16.

At this time, the video signal obtained from photographing by the spot TV camera 15 is synchronized with a clock signal of the clock generator 14, digitized through the analog/digital converter 21 and then inputted to the memory controller 22 as video data.

The alarm processing microcomputer 11 controls the memory controller 22 so that photographing is performed by said spot TV camera as many times as the preset number N and at predetermined time intervals T. The video data converted to digital data through the analog/digital converter 21 is stored in the memory 23. Also, the alarm processing microcomputer 11 turns the transmission control switch SW2 on through the transmission switch driving section 35 to connect the matching transformer T1 to the telephone lines L1, L2 to ready it for transmission and then calls a receipt side by generating a DTMF of the stored receipt-side telephone number through the DTMF generator 32.

The tone decoder 33 detects and inputs to the alarm processing microcomputer 11 a receipt side tone signal received through the matching transformer T1 after a receipt side call.

The alarm processing microcomputer 11 takes note of this. If there is a busy tone signifying that the telephone line at the receipt side is busy, the alarm processing microcomputer 11 makes another call for the receipt side by generating the DTMF of the receipt side telephone number again, after a stand-by period of a certain time. If there is no busy tone, the alarm processing microcomputer 11 determines if there is a ring back tone which indicates the completion of a receipt readiness of the receipt side.

If there is no ring back tone because of the completion of the receipt readiness of the receipt side, the alarm processing microcomputer 11 generates a data transmission indication signal for notifying that there will be a data transmission to transmit to the receipt side, controls the memory controller 22 to read and input to the modulator 31 the video data stored in said memory 23, and controls the buffer 34 to transmit the modulated video data signal through the matching transformer T1 for data communication from the modulator 31.

And, after having transmitted the video data, the alarm processing microcomputer 11 counts said setup time t1 while waiting for a receipt side retransmission request and checks if there is the receipt side retransmission request within the setup time t1 through the tone decoder 33. If there is a retransmission request within said setup time t1, the alarm processing microcomputer 11 generates the data transmission indication signal through the DTMF generator 32, transmits the next video data in the memory and then puts in a stand-by state again for said setup time t1.

If there is no retransmission request within the setup time t1, the alarm processing microcomputer 11 controls the transmission switch driving section 35 to turn the transmission contrl switch SW2 off.

Accordingly, the data transmission is completed with making a shortcircuit between the telephone line L1 and the matching transformer T1.

As mentioned above, in the event of an emergency situation occurrence such as an invader, a fire or the like, the supervisory alarm transmission device 100 mounted in the shops in which a supervisor can not reside transmits the video data photographed by the spot TV camera 15 to a remote alarm receipt device 200, and thus the remote alarm receipt device 200 receives the video data and displays it through the monitor 66 or stores it in the memory 64 in order for a supervisor to watch it.

Figure 5:
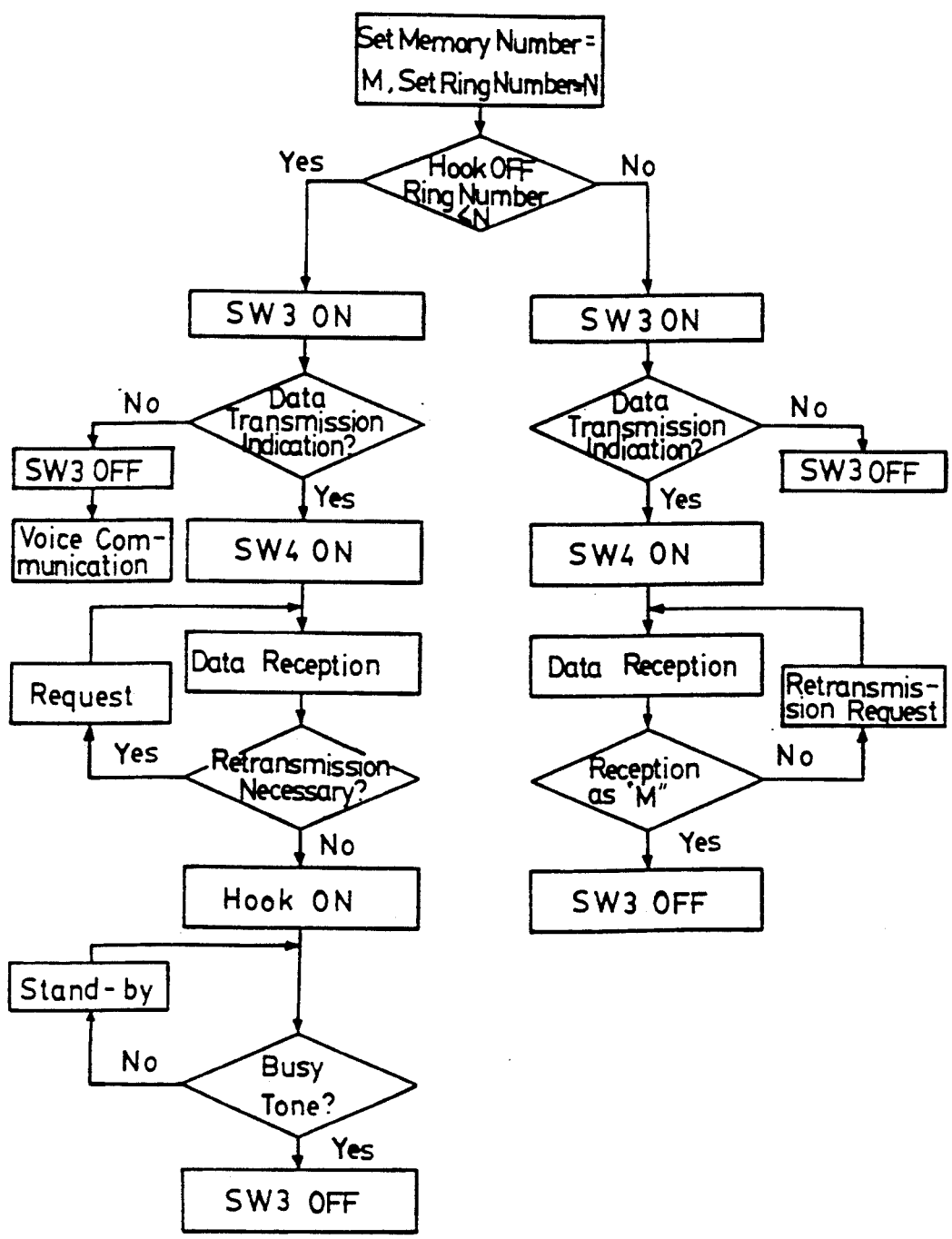
FIG. 5 is a control flow chart according to FIG. 3.

FIG. 5 is a receipt control flow chart of a remote alarm receipt device according to the present invention.

Referring to this Figure, the operation of the remote alarm receipt device 200 in FIG. 3 will be described below.

First of all, the number of times of storage for received video data (hereinafter, referred to receipt storage times) M and the number of times of received rings (hereinafter, referred to receipt ring times) R are set in a receipt control microcomputer 51.

The receipt storage times M are set for storing a certain amount of the video data received through the alarm receipt device 200 in case that there is no supervisor, and the receipt ring times R is set for deciding if an answer is made on the telephone at the receipt side.

The alarm receipt device 200 goes into a stand-by state after the receipt storage times M and the receipt ring times R have been set as mentioned above.

According to this, if ring signals which are transmission side telephone calls are detected through a ring detector 41, receipt control microcomputer 51 decides if the hook switch of the telephone set 47 is turned off through a hook detector 42, that is, if a user hangs up the receiver of the telephone set 47 while counting the number of times of ring signals up to the receipt ring times R.

If the telephone call is not answered within the previously set receipt ring times R, the receipt control microcomputer 51 decides that the user is absent and turns the receipt contrl switch SW3 on through a receipt switch driving section 43.

Since turning the receipt control switch SW2 on makes a connection between a matching transformer T2 and a telephone line L′1 to cut off the ring back tone, the receipt control micrcumputer 51 generates a data transmission indication signal in case that the transmission side transmits data transmission.

The receipt control microcomputer 51 senses if there is a data transmission indication signal from the transmission side through the tone decoder 46 after the completion of its receipt readiness.

If there is no data transmission indication signal, the receipt control microcomputer 51 turns the receipt control switch SW3 off because it is a general, voice telephone call.

However, if there is a data transmission indication signal, the receipt control microcomputer 51 turns the power contrl switch SW4 on to operate the receipt data processing section 60 because it is a telephone call for video data, and controls the memory controller 63 to store the received video data in the memory 64.

That is, the video data which is picture data on-the-spot transmitted through the telephone lines L′1, L′2 is matched with the receipt side through the matching transformer T2, amplified at the amplifier 44, demodulated to video signal at the demodulator 61, digitized at the analog/digital converter 62 and inputted to the memory controller 63 as a video data signal.

The memory controller 63 stores in the memory 64 the video data received according to the control of said receipt control microcomputer 51.

At this time, the receipt control microcomputer 51 makes retransmission requests to the transmission side until the video data stored in the memory 64 is received and stored as many as the previously set receipt storage time M.

The receipt control microcomputer 51 turns the receipt control switch SW3 off to end the receipt when it has received and stored the video data as many as the previously set receipt storage times M according to the retransmission requests.

In the meantime, when ring signals are detected by the transmission side telephone call, if the hook switch of the telephone set is turned off within the previously set receipt ring times R, that is, if a user answers the telephone, the receipt control microcomputer 51 turns the receipt control switch SW3 on and then senses if there is a data transmission indication signal through the tone decoder 46.

If there is no data transmission indication signal, the receipt control microcomputer 51 turns the receipt control switch SW3 off to make only a voice communication possible through the telephone 47, and if there is a data transmission indication signal, the receipt control microcomputer 51 turns the power control switch SW4 on to supply power from the power supply 54 to the receipt data processing section 60.

According to this, the video data which is picture data on-the-spot and which is demodulated through the demodulator 61 and digitized through the analog/digital converter 62 is inputted in the memory controller 63. Since a user answers the telephone within the previously set receipt ring times R, the receipt control microcomputer 51 controls said memory controller 63 to convert the received video data to analog signals through the digital/analog converter 65 for the monitor 66. Accordingly, the user can watch the spot situation in pictures through the monitor 66.

If a supervisor wants to receive more pictures on the monitor 66, the supervisor presses the keys of the telephone set 47 to generate a retransmission tone which has been set.

After receiving new spot pictures until any retransmission request is not necessary, the supervisor hangs up the receiver of the telephone set 47 to turn the hook switch on.

The receipt control microcomputer 51 awaits until a busy tone is generated by the turn-on of the hook switch. If busy tone is generated, the receipt control microcomputer 51 turns the receipt control switch SW3 and the power control switch SW4 off to end the receipt.

Figure 6:
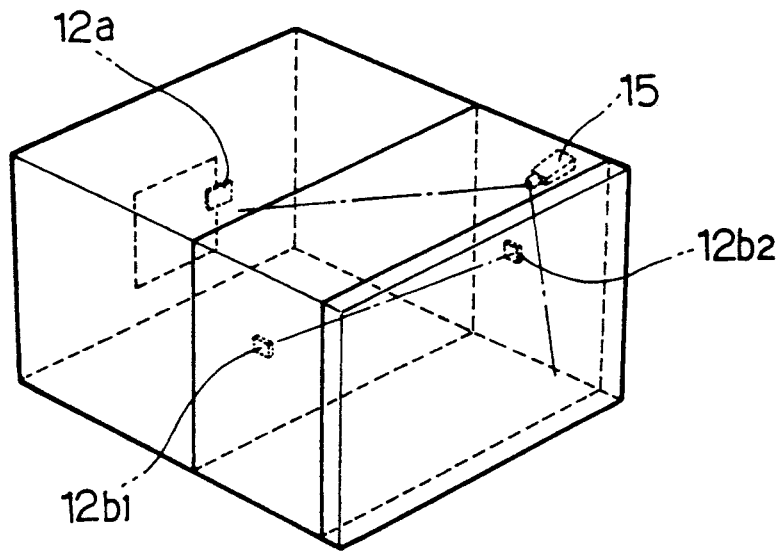
FIG. 6 is a perspective illustrating an arrangement of sensors and a TV camera, as an example for explaining the present invention.

FIG. 6 is an arrangement view of sensors and a spot TV camera for explaining the present invention.

A first sensor 12a for sensing pressure and vibration is mounted at the window, a light-emitting element 12b1 and a light-receiving element 12b2 are mounted at opposite sides of an exit, and a spot TV camera 15 is mounted at a position by which the window and the exit can be monitored. When the supervisory alarm transmission device 100 comprises these sensors 12a, 12b and the spot TV camera 15, the alarm processing microcomputer 11 turns the spot TV camera 15 on to start photographing the spot according to an output of the first sensor 12 which senses said pressure and vibration.

At this time, if the second sensor 12b outputs its sensing output, the supervisory alarm transmission device 100 controls the video data processing section 20 to store video data and also controls the data transmitting section 30 to transmit the video data.

As mentioned above, various sensors are mounted at each of the monitoring positions as a sensing section 12.

According to the outputs of the sensors, the alarm processing microcomputer 11 operates the spot TV camera 15 and controls the video data processing section 20 and the data transmitting section 30, wherein the control procedures and timing of the microcomputer 11 depends on the programs which have been set.

Accordingly, when a sensing section 12 which consists of sensors suitable for purposes of supervisory against a burglar, a fire or the like is mounted in a small-size building or a shop that a supervisor can not reside in, a supervisory alarm transmission device 100 equipped with a spot TV camera 15 is mounted in a monitoring place in order to photograph the spot, and a remote alarm receipt device 200 is mounted in user's remote premise along with interrelated program data and kept in a stand-by state, the alarm processing microcomputer 11 of the supervisory alarm transmission device 100 operates the spot TV camera according to the output of the sensing section 12 which consists of sensors to photograph the spot and stores video data through the video data processing section 20 up to the number of times of storage for received video data N set up in the memory 23 at a predetermined time interval T.

And also, the alarm processing microcomputer 11 calls through the data transmitting section 30 the telephone number of user's premise which is a telephone number equipped with the remote alarm receipt device 200, transmits through the telephone lines L1, L2 the spot video data stored in said memory 23 when the receipt side has finished its readiness.

If there is a retransmission request at the receipt side, the alarm processing microcomputer 11 transmits new video data.

If there is a telephone call at the transmission side which is the supervisory alarm transmission device 100, the remote alarm receipt device 200 which is the receipt side receives video data in response to the telephone call when having finished its receipt readiness.

The remote alarm receipt device 200 displays the received video data on the monitor 66 in order for the user to see the spot situation at a real time in case that the hook switch is turned off within the receipt ring times R, that is, in case that the user answers the telephone.

At this time the user can watch the spot situation in new spot pictures by making a retransmission request in order to examine the spot situation through the spot pictures.

And also, if the hook switch is not turned off within the receipt ring times R due to the absence of the user, the remote alarm receipt device 200 stores the received video data in the memory 64 after the receipt readiness has been ended, is as many as a predetermined receipt storage times M with the retransmission request. According to this, the user can play the stored video data back and watch the spot situation through the monitor 66.

As described above, the present invention has an interconnected configuration between the supervisory alarm transmission device which is mounted in buildings, shops or the like where supervision is desired and the remote alarm receipt device which is mounted in user's remote premise. According to this, since the user can watch the situations through a monitor at a real time in case of an event occurrence according to a supervisory purpose such as a burglar, a fire or the like, the present invention has an effect that a user can take an instant countermeasure as well as another effect that the power consumption is minimized in a stand-by state because only the stand-by electric power is supplied to the supervisory alarm transmission device and the remote alarm receipt device until data is received according to event occurrence sensing by each sensed section and to a data transmission indication signal.

What is claimed is:

1. A supervisory alarm transmission device, comprising:

sensing means for sensing an alarming event;

an alarm processing control section responsive to said sensing means and effective for directing a camera towards said alarming event and for producing video images of said alarming event;

a control means for said alarm processing control section, said control means including operator control input means for receiving from an operator at least a first value N signifying a number of video images to be taken of a sensed alarming event and a second value T signifying a time delay between successive video images;

a video data processing section for converting said video images to video data, storing video data according to a predetermined protocol of said alarm processing control section and outputting said stored video data; and a data transmission section for generating and transmitting to a receiving station a dual tone multi-frequency signal carrying said stored video data in a format matched to selected telephone lines according to control information of said alarm processing control section, said data transmission section being further effective for inputting receiving-side responses and for modulating the video data from said video data processing section and transmitting the modulated video data through said telephone lines.

2. The supervisory alarm transmission device of claim 1, wherein said alarm processing control section comprises:

a sensing section including said sensing means and mounted for sensing the alarming event and for outputting an output comprising a sensed event signal;

a spot television camera mounted for photographing a spot where said alarming event is located;

an alarm processing microcomputer for controlling photographing said spot and for controlling said video data processing section;

a clock generator for generating timing clocks for said alarm processing microcomputer and for said video data processing section; and a power source switch for switching electrical power of a power source on and off to said spot television camera, said video data processing section and said data transmitting section according to control information received from said control means.

3. The supervisory alarm transmission device of claim 2, wherein said video data processing section comprises:

an analog/digital converter for digitizing video outputs of said television camera;

a memory controller for controlling the storage of the video data generated from said analog/digital converter; and a memory for storing said video data according to said memory controller.

4. The supervisory alarm transmission device as in claim 1, wherein said data transmitting section comprises:

a modulator for modulating the video data received from the video data processing section and transmitting the modulated video data to the telephone lines, a dual tone multifrequency generator for generating a receive side telephone number and a data transmission indication in dual tone multifrequency format according to said control information of the alarm processing control section, a tone decoder for detecting and decoding a tone signal to input the decode tone signal to said alarm processing control section, a buffer for buffering outputs of said modulator and dual tone multifrequency generator for transmission according to the control information of said alarm processing control section, a matching transformer for matching the output of the buffer to the telephone lines, a transmission control switch for switching on/off a connection of the matching transformer and said telephone lines, and a transmission switch driving section for driving said transmission control switch according to the control information of said alarm control section.

5. A remote alarm receiving device, comprising:

a data receiving section, including a telephone set, for detecting a ring signal and a hook switch state associated with a telephone call, for detecting a tone signal after matching the same with an amplifying transmission signal, and for generating a retransmission on request as a dual tone multifrequency signal;

a control section for controlling a ring signal, a hook state signal and a tone signal received from said data receiving section, for controlling said retransmission request, and for controlling data processing of data received by said data receiving section;

a data processing section for storing in a memory or displaying on a screen digitized video data derived from demodulated video signals received through said data receiving station according to predetermined control criteria; and said control section including means for determining whether said telephone call has been manually answered and for directing said video data into said memory when said telephone call has not been manually answered and for directing said video data to said screen when said telephone call has been manually answered.

6. The remote alarm receiving device as in claim 5, wherein said data receiving section comprises:

a ring detector for detecting said ring signal, a hook detector for detecting the hook switch state of said telephone set, a matching transformer for receiving signals transmitted through said telephone lines, a receipt control switch for switching on/off said telephone lines connected to said matching transformer according to control information of a receipt switch driving section, an amplifier for amplifying the signals received through said matching transformer, a tone decoder for detecting a tone signal from an output of the amplifier; and a dual tone multifrequency generator for generating a dual tone multifrequency signal of the retransmission request.

7. The remote alarm receiving device as in claim 6, wherein the control section comprises:

a control microcomputer for controlling the receipt switch driving section and the amplifier with the ring signal, for controlling the hook state signal and tone signal received from the data receiving section, for controlling the dual tone multifrequency generator for the retransmission request, and for controlling the receiving data processing section, a clock generator for generating timing clocks for the control microcomputer and the data processing section, and a power control switch for switching on/off electric power supplied to the processing section according to the control information.

8. The remote alarm receiving device as in claim 5, wherein the data processing section comprises:

a demodulator for generating the demodulated video signals, an analog/digital converter for digitizing the demodulated video signals, a memory controller for controlling storing in the memory or diplaying on the screen an output of the analog/digital converter comprising as many video images as defined by a predetermined number included in said predetermined control criteria, a digital/analog converter for converting to an analog signal video data obatined from said memory, and said screen serving for displaying the output of the digital/analog converter pictorially.

* * * * *